(12) United States Patent
Paulson et al.

(10) Patent No.: US 10,933,986 B2
(45) Date of Patent: Mar. 2, 2021

(54) BLADE FOLD METHOD AND APPARATUS FOR A TILT ROTOR HUB

(71) Applicant: Bell Helicopter Textron Inc., Fort Worth, TX (US)

(72) Inventors: Jared Mark Paulson, Fort Worth, TX (US); Ken Shundo, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 93 days.

(21) Appl. No.: 16/016,280

(22) Filed: Jun. 22, 2018

(65) Prior Publication Data

US 2019/0389569 A1 Dec. 26, 2019

(51) Int. Cl.
| | | |
|---|---|---|
| *B64C 27/50* | (2006.01) | |
| *F16H 37/12* | (2006.01) | |
| *B64C 29/00* | (2006.01) | |
| *B64C 3/56* | (2006.01) | |

(52) U.S. Cl.
CPC ........... *B64C 27/50* (2013.01); *F16H 37/122* (2013.01); *B64C 29/0033* (2013.01)

(58) Field of Classification Search
CPC ..... B64C 27/50; B64C 29/0033; B64C 11/28; B64C 3/56; B64C 11/32; B64C 27/30; F16H 37/122; F04D 29/388
USPC .......................................................... 416/142
See application file for complete search history.

(56) References Cited

U.S. PATENT DOCUMENTS

| | | | |
|---|---|---|---|
| 2,623,713 A | 12/1952 | Foster | |
| 2,658,576 A | 11/1953 | Mosinskis | |
| 3,026,942 A | 3/1962 | Cresap | |
| 3,153,455 A | 10/1964 | Mosinskis | |
| 3,625,631 A | 12/1971 | Covington, Jr. et al. | |
| 3,652,185 A | 3/1972 | Cresap et al. | |
| 3,749,515 A * | 7/1973 | Covington | B64C 27/50 416/143 |
| 3,967,918 A | 7/1976 | Mouille et al. | |
| 4,252,504 A | 2/1981 | Covington et al. | |
| 4,257,739 A | 3/1981 | Covington et al. | |
| 4,268,222 A | 5/1981 | Bernard | |
| 4,427,340 A | 1/1984 | Metzger et al. | |
| 4,522,563 A | 6/1985 | Reyes et al. | |
| 4,691,878 A | 9/1987 | Vaughan et al. | |
| 5,031,858 A | 7/1991 | Schellhase et al. | |
| 5,059,094 A | 10/1991 | Robinson et al. | |
| 5,096,380 A | 3/1992 | Byrnes et al. | |

(Continued)

OTHER PUBLICATIONS

Paulson, Jared Mark, "U.S. Appl. No. 15/845,720", filed Dec. 18, 2017.

(Continued)

*Primary Examiner* — Michael Lebentritt
*Assistant Examiner* — Eric J Zamora Alvarez
(74) *Attorney, Agent, or Firm* — Shackelford, Bowen, McKinley & Norton, LLP (57) ABSTRACT

A folding rotor blade assembly includes a blade fold support and a blade-fold actuator system coupled to the blade fold support. The blade-fold actuator system includes a motor, a tab configured to selectively prevent rotation of a blade tang of a rotor blade, and a cam connected to the blade fold support and coupled to the motor, the cam configured to move the tab between a locked position that prevents rotation of the blade tang and an unlocked position that permits rotation of the blade tang.

19 Claims, 10 Drawing Sheets

(56) References Cited

U.S. PATENT DOCUMENTS

| | | | |
|---|---|---|---|
| 5,337,974 A | 8/1994 | Rumberger et al. | |
| 5,358,381 A | 10/1994 | Covington et al. | |
| 5,645,400 A | 7/1997 | Hunter et al. | |
| 5,868,351 A * | 2/1999 | Stamps | B64C 27/50 244/12.4 |
| 6,036,442 A | 3/2000 | Certain et al. | |
| 7,530,790 B2 | 5/2009 | Cabrera et al. | |
| 8,231,346 B2 * | 7/2012 | Stamps | F16F 1/40 416/134 A |
| 8,360,727 B2 | 1/2013 | Stamps et al. | |
| 9,156,545 B1 | 10/2015 | Fenny et al. | |
| 9,169,010 B2 | 10/2015 | Foskey et al. | |
| 9,499,262 B2 | 11/2016 | Foskey et al. | |
| 2004/0026564 A1 | 2/2004 | Romani et al. | |
| 2013/0149151 A1 | 6/2013 | Rauber et al. | |
| 2014/0271199 A1 | 9/2014 | Maresh et al. | |
| 2014/0271222 A1 | 9/2014 | Maresh et al. | |
| 2015/0125300 A1 | 5/2015 | Stamps et al. | |
| 2016/0152329 A1 | 6/2016 | Tzeng et al. | |
| 2017/0144746 A1 * | 5/2017 | Schank | B64C 29/0033 |
| 2017/0320567 A1 | 11/2017 | Miller et al. | |
| 2018/0229830 A1 | 8/2018 | Foskey et al. | |
| 2018/0244377 A1 | 8/2018 | Chan | |

OTHER PUBLICATIONS

Paulson, Jared Mark, "U.S. Appl. No. 15/845,810", filed Dec. 18, 2017.

Paulson, Jared Mark, "U.S. Appl. No. 15/845,876", filed Dec. 18, 2017.

Paulson, Jared Mark, "U.S. Appl. No. 15/845,928", filed Dec. 18, 2017.

Paulson, Jared Mark, "U.S. Appl. No. 15/845,967", filed Dec. 18, 2017.

Paulson, Jared Mark, "U.S. Appl. No. 15/846,011", filed Dec. 18, 2017.

Cravener, Kyle Thomas, "U.S. Appl. No. 15/963,516", filed Apr. 26, 2018.

* cited by examiner

FIG. 11

BLADE FOLD METHOD AND APPARATUS FOR A TILT ROTOR HUB

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that a maximum number of aircraft can be accommodated within the limited storage space, blade assemblies of some rotor systems can be folded so that each rotor blade is generally parallel with each other rotor blade in order to reduce the overall profile of the blade assembly. Typically, each rotor blade is folded about a single pivot point positioned outboard of a yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

A folding rotor blade assembly includes a blade fold support and a blade-fold actuator system coupled to the blade fold support. The blade-fold actuator system includes a motor, a tab configured to selectively prevent rotation of a blade tang of a rotor blade, and a cam connected to the blade fold support and coupled to the motor. The cam is configured to move the tab between a locked position that prevents rotation of the blade tang and an unlocked position that permits rotation of the blade tang.

A folding rotor blade system includes a yoke, a grip coupled to the yoke via an inboard bearing assembly, a rotor blade coupled to the grip via an outboard bearing assembly, a blade fold support connected to the grip, and a blade-fold actuator system coupled to the blade fold support. The blade-fold actuator system includes a motor, a tab configured to selectively prevent rotation of a blade tang of the rotor blade, and a cam connected to the blade fold support and coupled to the motor. The cam is configured to move the tab between a locked position that prevents rotation of the blade tang and an unlocked position that permits rotation of the blade tang.

A method of folding a rotor blade includes pitching a rotor blade to a high-collective position, actuating a motor of a blade-fold actuator system for a first phase to disengage a tab from the rotor blade, and actuating the motor of the blade-fold actuator system for a second phase to rotate the rotor blade into a folded position.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 1:
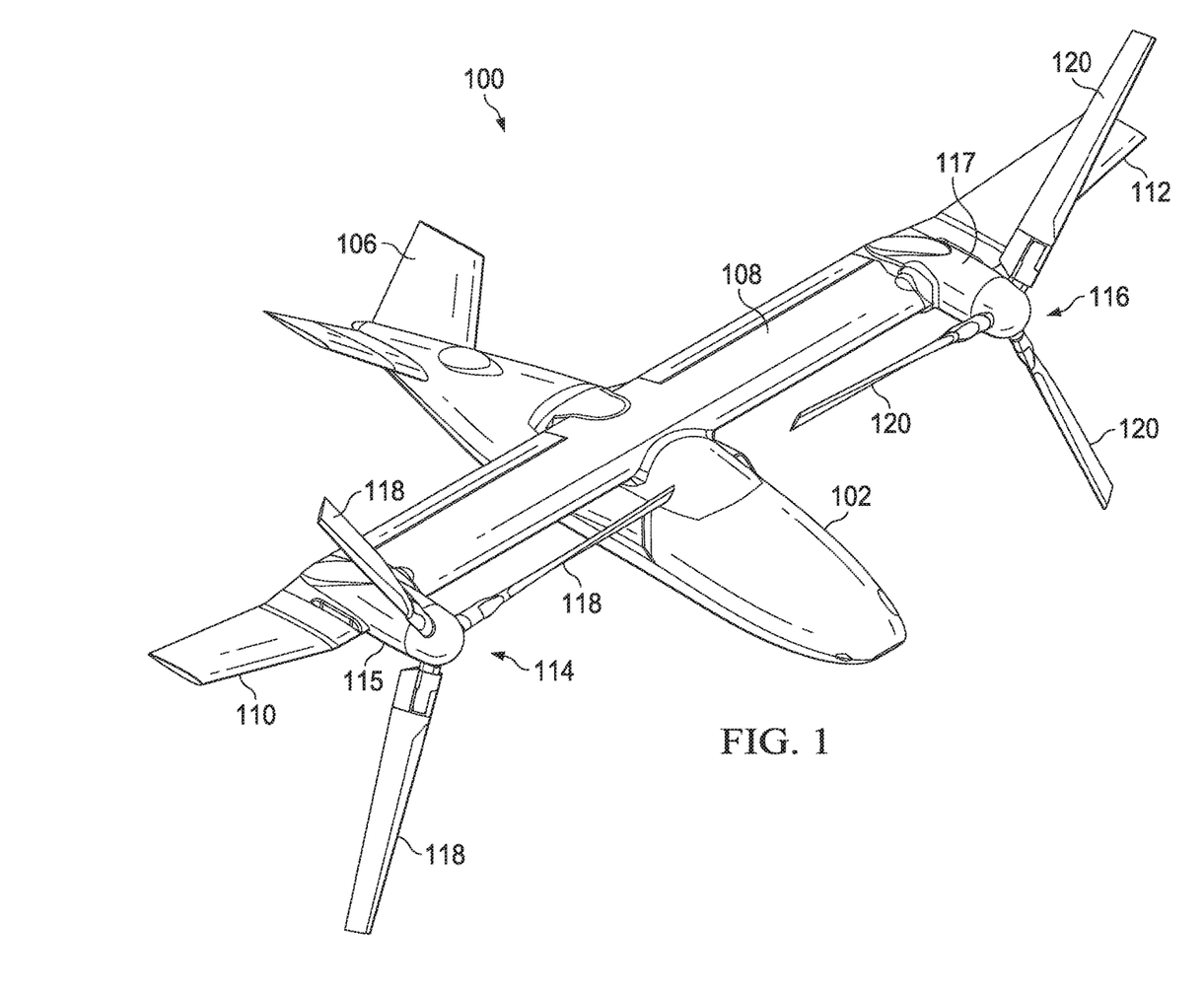
FIG. 1 is a perspective view of an exemplary tiltrotor aircraft configured in a flight ready position according to aspects of the disclosure.
Figure 2:
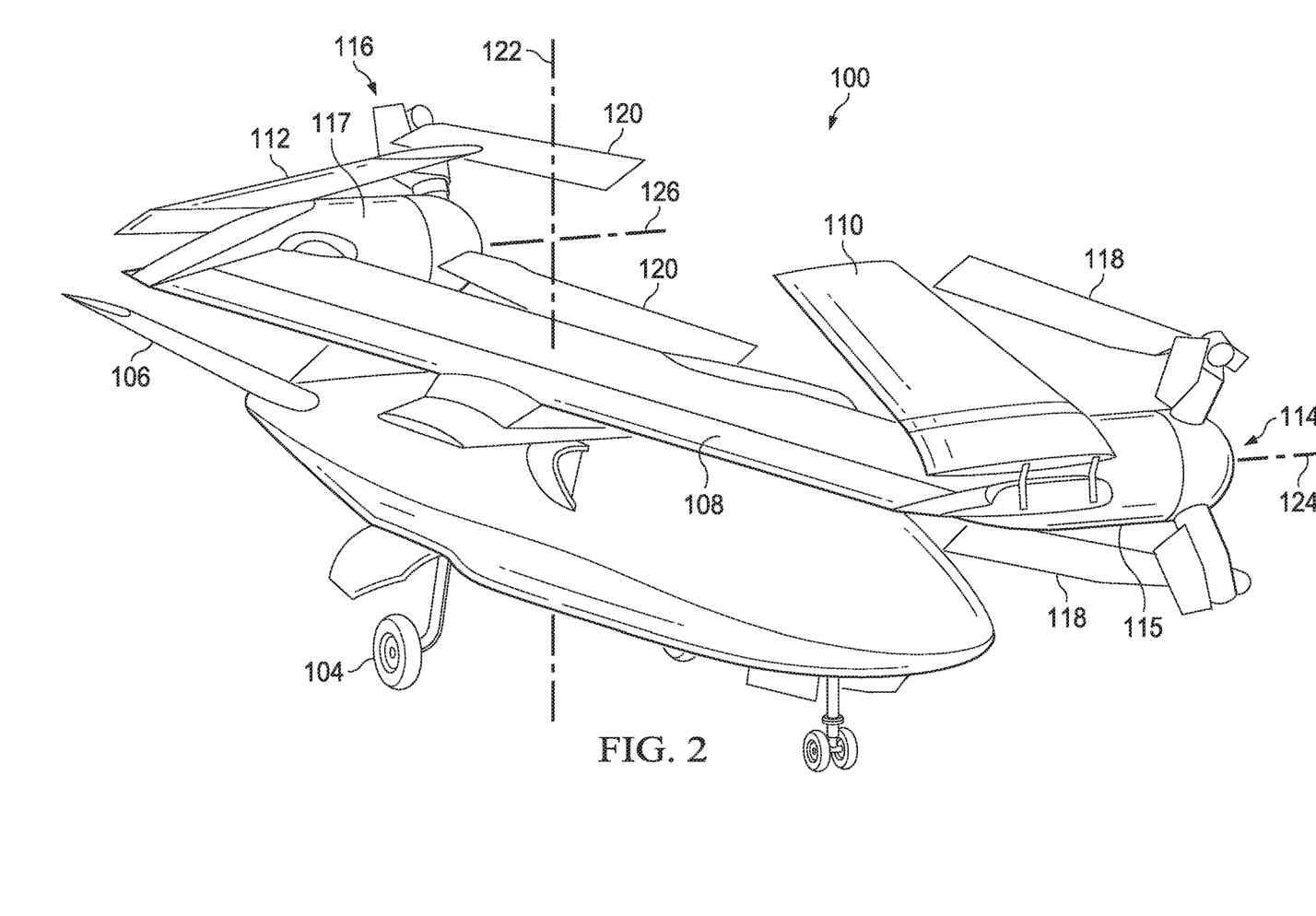
FIG. 2 is a perspective view of an exemplary tiltrotor aircraft configured in a stowed position according to aspects of the disclosure.

Referring to FIGS. 1 and 2, an exemplary tiltrotor aircraft 100 is shown. FIG. 1 is a perspective view of the tiltrotor aircraft 100 configured in a flight ready position and FIG. 2 is a perspective view of the tiltrotor aircraft 100 configured in a stowed position. The tiltrotor aircraft 100 includes a fuselage 102, landing gear 104, a tail member 106, a wing 108, a wing tip 110, a wing tip 112, a rotor system 114, and a rotor system 116. The rotor system 114 is housed within a nacelle 115 located on an end portion of the wing 108 that is proximal the wing tip 110. The rotor system 116 is housed within nacelle 117 located on an opposite end portion of the wing 108 that proximal the wing tip 112. The wing tip 110 is pivotable at a location on the wing 108 that is outboard the nacelle 115. The wing tip 112 is pivotable at a location on the wing 108 that is outboard the nacelle 117. Nacelles 115, 117 are pivotable between a helicopter mode where the rotor systems 114, 116 are generally vertical and an airplane mode where the rotor systems 114, 116 are generally horizontal.

The nacelles 115, 117 are substantially symmetric relative to each other about the fuselage 102.

The rotor system 114 includes a plurality of foldable rotor blades 118 and the rotor system 116 includes a plurality of foldable rotor blades 120. The rotor blades 118, 120 may rotate in opposite directions to cancel torque associated with the operation of each rotor system 114, 116. An angle of the pivotable nacelles 115, 117 relative to the wing 108, as well as the pitch of rotor blades 118, 120, can be adjusted in order to selectively control direction, thrust, and lift of the tiltrotor aircraft 100. The rotor systems 114, 116 are illustrated in the context of the tiltrotor aircraft 100; however, a singular rotor system with foldable rotor blades can be implemented on other non-tilting rotor and helicopter rotor systems. It should also be appreciated that teachings relative to the tiltrotor aircraft 100 may apply to other aircraft such as airplanes and unmanned aircraft which would benefit from folding rotor blades.

The fuselage 102 represents a body of the tiltrotor aircraft 100 and may be coupled to the rotor systems 114, 116 such that the rotor systems 114, 116, along with the rotor blades 118, 120, may move tiltrotor aircraft 100 through the air. The landing gear 104 supports the tiltrotor aircraft 100 when the tiltrotor aircraft 100 is landing or when the tiltrotor aircraft 100 is at rest on the ground. FIG. 2 illustrates a vertical axis 122 that is generally perpendicular to a longitudinal axis 126 of the wing 108. An intersection of the vertical axis 122 and the longitudinal axis 126 is generally positioned at an intersection of the fuselage 102 and the wing 108. FIG. 1 represents tiltrotor aircraft 100 in flight ready position in an airplane mode. FIG. 2 represents tiltrotor aircraft 100 in a stowed position with the rotor blades 118 folded generally parallel to each other and the rotor blades 120 folded generally parallel to each other in order to reduce dimensions of the tiltrotor aircraft 100 to whatever degree is required in response storage space restrictions. In the stowed position, the wing 108 is swivelled approximately 90° to generally align with a length of the fuselage 102.

Referring to tiltrotor aircraft in general, each rotor system includes a mast driven by a power source (e.g., an engine or motor). Each rotor system also includes a yoke connected to the mast, with rotor blades indirectly connected to the yoke with bearings. The bearings may be, for example, elastomeric bearings constructed from a rubber type material that absorb vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces include forces resulting from flapping and coning of the rotor blades. Flapping can refer to an up-and-down movement of a rotor blade positioned at a right angle to the plane of rotation or can refer to a gimballing of the hub or a teetering rotor. Coning generally refers to an upward flexing of a rotor blade due to lift forces acting on the rotor blade. Generally speaking, the hub is not rigidly connected to the mast and a differential coning of the rotor blades can cause the hub to tilt relative to the mast.

The rotor blades may be subject to other forces, such as axial, lead/lag, and feathering forces. Axial forces generally refer to a centrifugal force on the rotor blades resulting from rotation of the rotor blades. Lead and lag forces generally refer to forces resulting from a horizontal movement of the rotor blades about a vertical pin that occur if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 3:
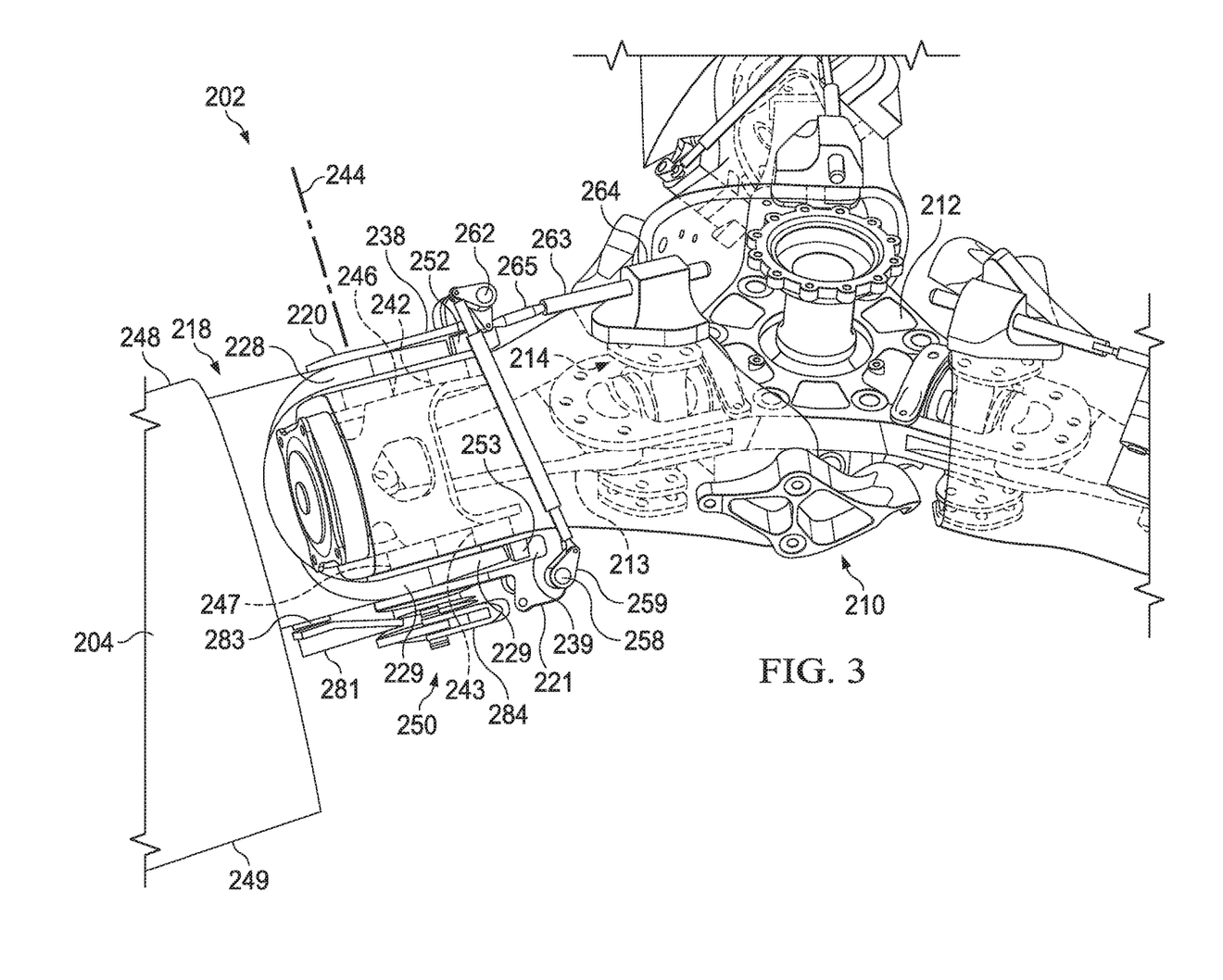
FIG. 3 is a partial perspective view of a top of a blade assembly according to one or more aspects of the disclosure.
Figure 4:
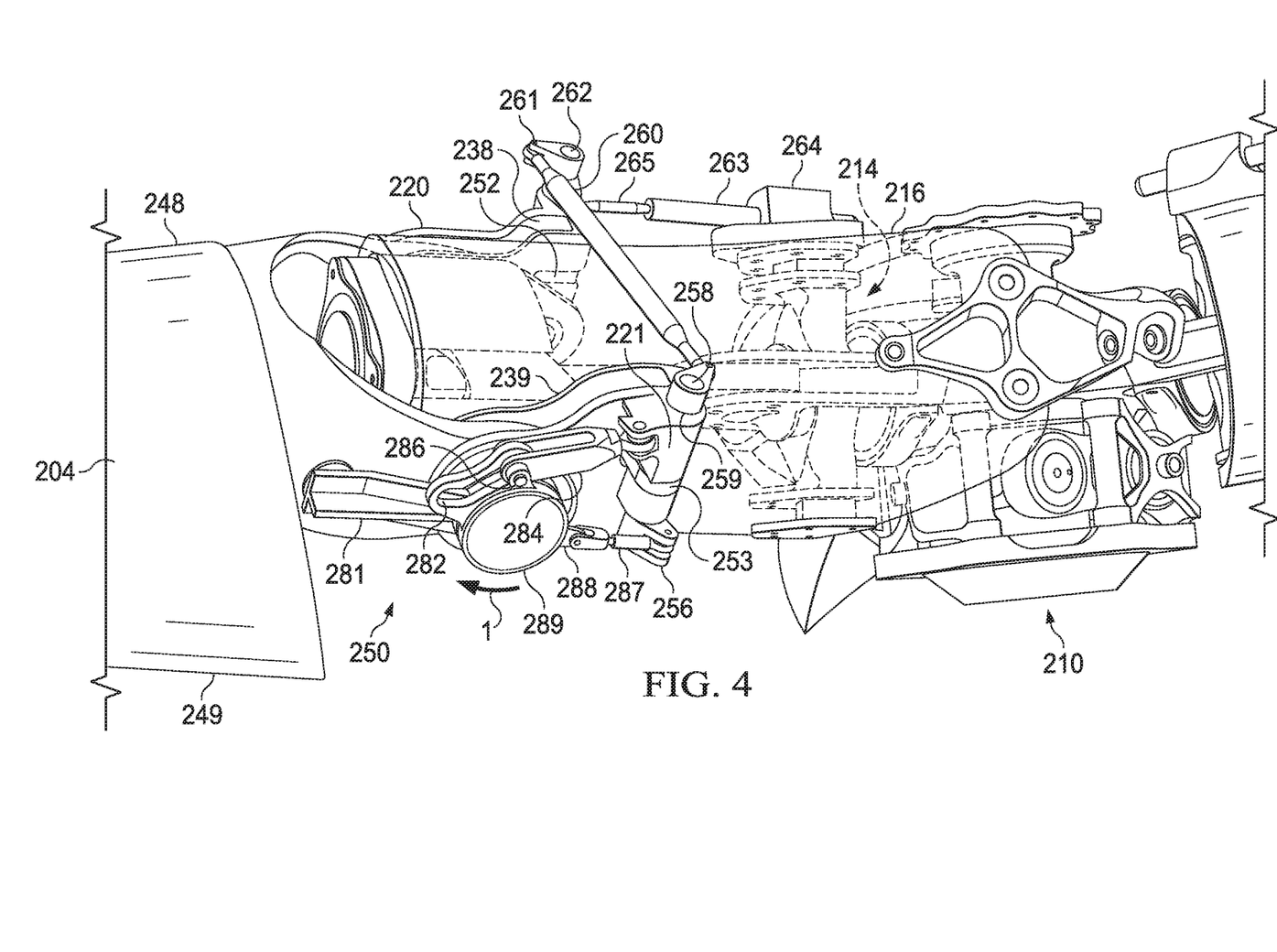
FIG. 4 is a partial perspective view of a bottom of the blade assembly of FIG. 3 according to one or more aspects of the disclosure.
Figure 5:
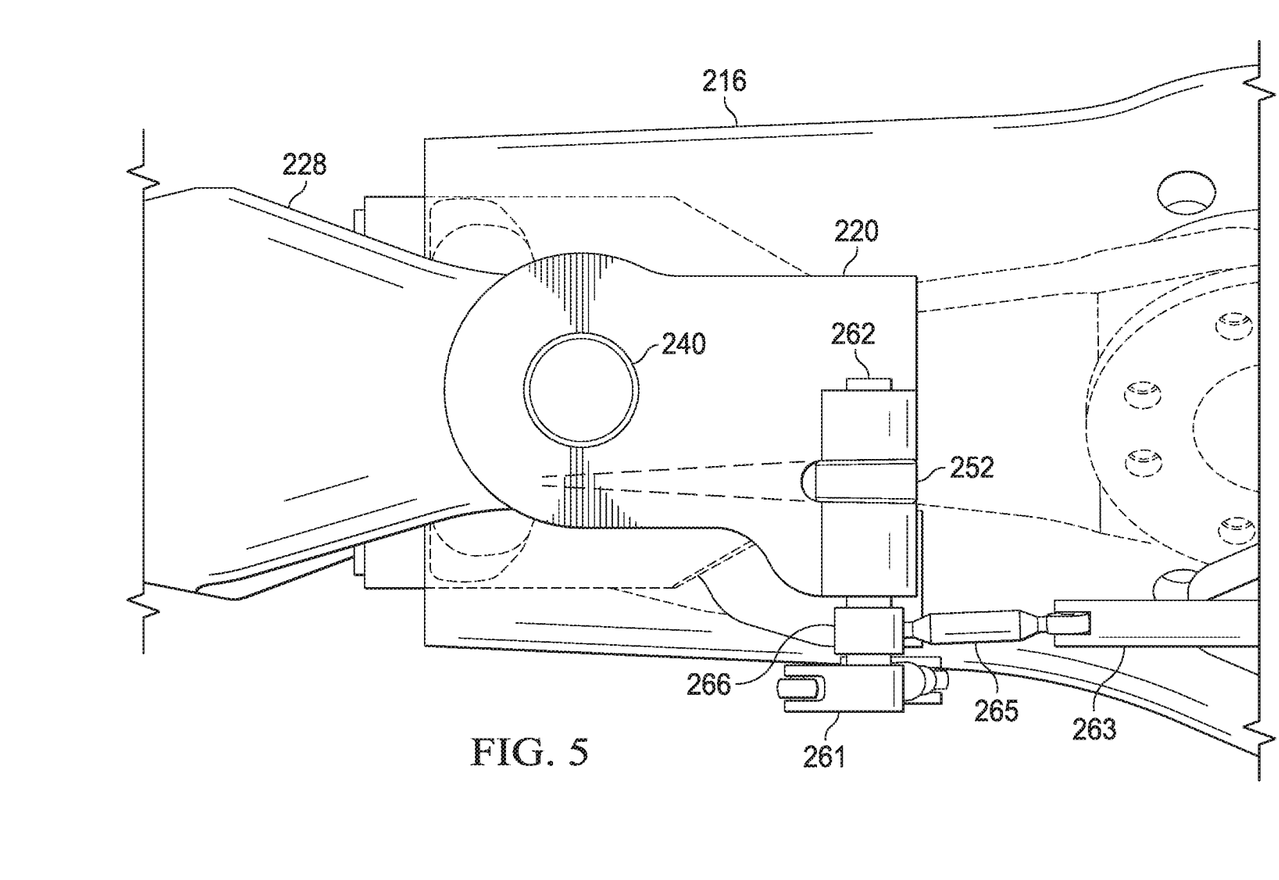
FIG. 5 is a partial top view of the blade assembly of FIG. 3 according to one or more aspects of the disclosure.
Figure 6:
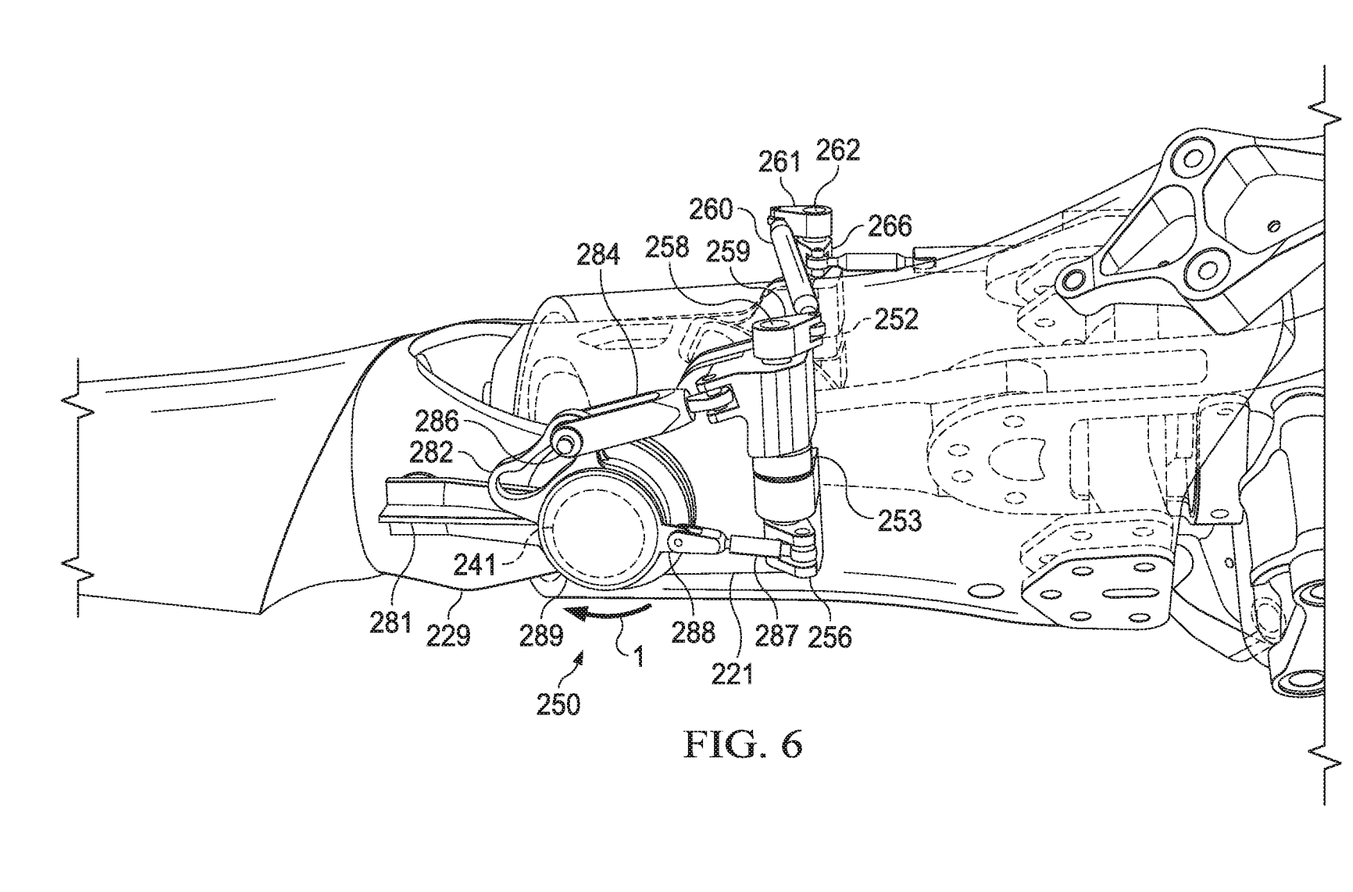
FIG. 6 is a partial bottom view of the rotor blade assembly of FIG. 3 according to aspects of the disclosure.

Referring to FIGS. 3-6, a rotor blade assembly 202 is shown. FIG. 3 is a partial perspective view of a top of rotor blade assembly 202 in an unfolded position with a grip 216 partially hidden to show components located inside the grip 216. FIG. 4 is a partial perspective view of a bottom of rotor blade assembly 202. FIG. 5 is partial top view of rotor blade assembly 202. FIG. 6 is a partial bottom view of rotor blade assembly 202. Each rotor system 114, 116 comprises a separate rotor blade assembly 202. In the interest of clarity, a single rotor blade assembly 202 is described herein with the understanding that tiltrotor aircraft 100 comprises a pair of similarly configured rotor blade assemblies 202. Rotor blade assembly 202 includes three rotor blades 204. In exemplary embodiments, each rotor blade 204 is similar to rotor blades 118, 120. In the unfolded position, each rotor blade 204 is generally equally spaced from each other rotor blade 204 around a yoke 212. For example, in a three rotor blade configuration, approximately 120° separates each rotor blade 204. Each rotor blade 204 includes leading edge 248 and trailing edge 249. It should also be appreciated that teachings regarding rotor blade assembly 202 can apply to blade assemblies 202 having a greater or fewer number of rotor blades 204.

Yoke 212 is mounted to a hub assembly 210. Yoke flexures 213 are coupled to and extend from the yoke 212, one for each rotor blade 204. In the interest of clarity, a single connection between the yoke 212 and one rotor blade 204 is described herein with the understanding that rotor blade assembly 202 comprises a similarly configured connection for each yoke 212 and rotor blade 204 interface. An inboard bearing assembly 214 connects yoke 212 to grip 216 and an outboard bearing assembly 218 connects yoke flexure 213 to grip 216. Inboard bearing assembly 214 includes components such as bushings and support pieces to transmit loads from grip 216 to yoke 212. Outboard bearing assembly 218 similarly includes components such as bushings and support pieces to transmit loads from rotor blade 204 to grip 216.

Blade fold supports 220, 221 are mounted to grip 216 and coupled to rotor blade 204 such that relative movement between the blade fold supports 220, 221 and the grip 216 is prevented and rotational movement of rotor blade 204 relative to blade fold supports 220, 221 is permitted. Blade fold supports 220, 221 are secured to grip 216 via a pair of blade fold bolts 240, 241. Blade fold supports 220, 221 may be further secured to the grip 216 with additional bolts, pins, rivets, welds and the like to prevent rotation of blade fold supports 220, 221 relative to grip 216. For example, as illustrated in FIGS. 3 and 4, blade fold supports 220, 221 include pins 242, 243 and hollow pins 246, 247, respectively. Hollow pins 246, 247 allow blade fold bolts 240, 241 to pass through axially aligned holes of blade fold supports 220, 221. Blade fold bolts 240, 241 provide a pivot point for rotor blade 204 about a central axis 244. Blade fold bolt 241 passes through hollow pin 247 and houses a portion of motor 289. In FIGS. 3-6, blade fold bolt 241 not visible because other components block a view of blade fold bolt 241.

Figure 10:
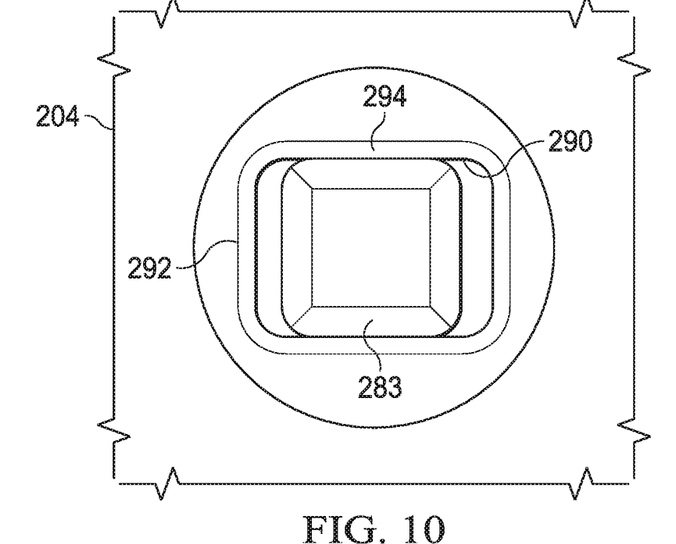
FIG. 10 is a close-up view of a coupling of a pin with a rotor blade according to one or more aspects of the disclosure.

In some embodiments, one or both of the blade fold bolts 240, 241 pass through additional components, such as a blade-fold actuator system 250. Blade-fold actuator system 250 is configured to unlock blade tangs 228, 229 before rotating rotor blade 204 and acts as a guide that limits a range of motion through which rotor blade 204 may pivot relative to blade fold supports 220, 221. Blade-fold actuator system 250 includes an arm 281 that couples blade-fold actuator system 250 to rotor blade 204. Arm 281 provides leverage to blade-fold actuator system 250 so that blade-fold actuator system 250 can more easily rotate rotor blade 204. In some embodiments, arm 281 is coupled to rotor blade 204 via a pin 283. FIG. 10 is a close up view of the coupling of pin 283 with rotor blade 204 according to one or more aspects of the disclosure. Pin 283 fits within a pin aperture 290. Pin aperture 290 includes a short side 292 and a long side 294. Short side 292 is sized so that pin 283 can only minimally move in a direction parallel to short side 292. Long side 294 is oriented to be parallel with a length of rotor blade 204 and is sized so that pin 283 can slide in a direction parallel with long side 294. Configuring pin aperture 290 in this way allows pin 283 to slide in pin aperture 290 to account for any variances in rotor positioning in a direction of the length of rotor blade 204, while at the same time maintaining contact between pin 283 and rotor blade 204 for rotational movement and control of rotor blade 204 during blade fold.

A track linkage 284 is coupled at a first end to blade fold support 221 and at a second end to a track 282. An actuator linkage 287 is coupled to cam 256 at a first end and to actuator 288 at a second end. A motor 289 provides torque to actuator 288 to rotate actuator 288 in clockwise and counter-clockwise directions. Track 282 allows track linkage 284 to move therethrough for a range of motion before motor 289 begins to rotate rotor blade 204.

In an exemplary embodiment, blade fold support 220 includes a slot 238 that accommodates blade tang 228 and blade fold support 221 includes a slot 239 that accommodates blade tang 229. Blade tangs 228, 229 extend from an inboard end of the rotor blade 204. Blade fold bolts 240, 241 have a central axis 244 about which rotor blade 204 and blade tangs 228, 229 may rotate. Slots 238, 239 are configured to work in conjunction with blade-fold actuator system 250 to lock rotor blade 204 in an extended or unfolded position. Blade-fold actuator system 250 can include a collection of cams, linkages, shafts, and tabs that are configured to move between locked and unlocked configurations. When blade-fold actuator system 250 is in the locked configuration, tabs 252, 253 are engaged with the slots 238, 239, and tangs 228, 229 are held in place to prevent rotor blade 204 from pivoting. When blade-fold actuator system 250 is in the unlocked configuration, tabs 252, 253 are disengaged from the slots 238, 239, and tangs 228, 229 are no longer restrained, which allows rotor blade 204 to pivot about blade fold bolts 240, 241. Operation of blade-fold actuator system 250 is discussed in more detail below.

FIGS. 3-6 illustrate rotor blade 204 in an unfolded position with blade-fold actuator system 250 in the locked configuration. Blade-fold actuator system 250 includes tabs 252, 253 that are configured to engage and disengage slots 238, 239, respectively. In the embodiment of FIGS. 3-6, tabs 252, 253 are configured to rotate into and out of slots 238, 239. When tabs 252, 253 are positioned as shown in FIG. 3, blade tangs 228, 229 are locked in place by tabs 252, 253 and rotor blade 204 cannot rotate about central axis 244. In the locked position, blade tang 228 is held in place between tab 252 and an internal wall of blade fold support 220. In some embodiments, a face of tab 252 that contacts blade tang 228 is tapered (e.g., see dashed lines extending from tab 252 in FIG. 5). Tapering the face of tab 252 that contacts blade tang 228 allows tab 252 to form a preload engagement against blade tang 228 to prevent blade tang 228 from having any free-play between tab 252 and blade fold support 220. A face of tab 253 may be similarly configured relative to blade tang 229. An angle of the tapering of the faces of tabs 252, 253 may be between 0° and 10°.

Motor 289 may be partially housed within blade fold bolt 241 and is configured to rotate actuator 288 about central axis 244. Rotation of motor 289 supplies torque to actuator 288 to manipulate actuator linkage 287 to engage and disengage tab 253 with the slot 239. Actuator linkage 287 is coupled at a first end to actuator 288 and at a second end to cam 256. As motor 289 rotates, actuator linkage 287 causes cam 256 to rotate. Shaft 258, upon which cam 256 is disposed, rotates with cam 256. Tab 253 is also disposed on shaft 258 and rotates with the shaft 258. Depending on a direction of rotation of motor 289, tab 253 moves either into or out of engagement with slot 239. In some embodiments, cam 256 is disposed on shaft 258 so that in the locked position cam 256 is over-centered to more securely lock tab 253. The term over-centered as used herein means that a lobe of cam 256 is positioned as shown in FIG. 3 (i.e., the lobe is to the right of bottom dead center as shown in FIG. 4).

The embodiment of FIGS. 3-6 includes a single motor 289 that is configured to operate both tabs 252, 253. Operation of tab 252 is accomplished via cam 259, linkage 260, cam 261, and shaft 262. Cam 259 is disposed on shaft 258. Rotation of shaft 258 rotates cam 259, which in turn moves linkage 260. Moving linkage 260 rotates cam 261 to cause shaft 262 and tab 252, which is disposed on shaft 262, to rotate. Thus, motor 289 can be used to actuate tabs 252, 253 to engage or disengage slots 238, 239, respectively. In other embodiments, two motors 289 are used. A first motor 289 actuates tab 252 and a second motor 289 actuates tab 253. In embodiments with two motors 289, cam 259, linkage 260, and cam 261 can be eliminated.

To transition from the locked configuration to the unlocked configuration, motor 289 rotates in the direction of arrow 1. Two phases of rotation of motor 289 occur. In a first phase, rotation of motor 289 actuates tabs 252, 253 and in a second phase motor 289 rotates rotor blade 204. In the first phase, motor 289 rotates a first amount that rotates tabs 252, 253 out of slots 238, 239 into the unlocked position. After motor 289 has rotated through the first phase, motor 289 continues to rotate through the second phase to rotate rotor blade 204.

Blade-fold actuator system 250 allows motor 289 to rotate through the first phase without moving rotor blade 204. Track 282 is configured to rotate with actuator 288. Track linkage 284 includes a pin 286 that slides within track 282. During the first phase, track 282 rotates in the direction of arrow 1 and pin 286 travels from an inboard end of track 282 to an outboard end of track 282. Once pin 286 reaches the outboard end of track 282, continued rotation of motor 289 imparts a force on the outboard end of track 282 and rotor blade 204 is rotated about central axis 244 to position rotor blade 204 in the folded position. A length of track 282 is designed so that pin 286 does not reach the outboard end of the track 282 until after tabs 252, 253 are in the unlocked position. To extend rotor blade 204, motor 289 rotates actuator 288 in a direction opposite arrow 1 and the process reverses itself.

In an exemplary embodiment, a swash plate is connected to the mast. Pitch links extend from the swash plate to pitch horns that are coupled to grips 216. The swash plate, pitch links, and pitch horns are operatively connected to an actuator to pitch rotor blades 204 relative to yoke 212 in a first direction about a central longitudinal axis of each rotor blade 204. The central longitudinal axis may also be referred to as a blade pitch change axis. Each rotor blade 204 is free to rotate or "pitch" about its central longitudinal axis with respect to the yoke 212 in a range between 0° and 90°. In some embodiments, prior to folding rotor blade 204, rotor blade 204 is pitched to 90° (see position illustrated in FIGS. 3-6). In such embodiments, blade-fold actuator system 250 can include a pitch lock pin 263 that is actuated by motor 289. Pitch lock pin 263 passes through a guide 264 that is secured to grip 216. Pitch lock pin 263 is coupled to a linkage 265 that is coupled to a cam 266. Cam 266 is disposed on shaft 262 and rotates with cam 261 and tab 252. When tab 252 is in the locked configuration (see FIG. 3), pitch lock pin 263 is retracted and rotor blade 204 is free to pitch as dictated by the pitch links. When tab 252 is in the unlocked position (see for example FIGS. 8 and 9), pitch lock pin 263 is extended and engages a portion of hub assembly 210 (e.g., a pillow block or another component of the hub assembly 210 that is within reach of the pitch lock pin 263). When pitch lock pin 263 is engaged with the hub assembly 210, rotor blade 204 cannot pitch.

Figure 7:
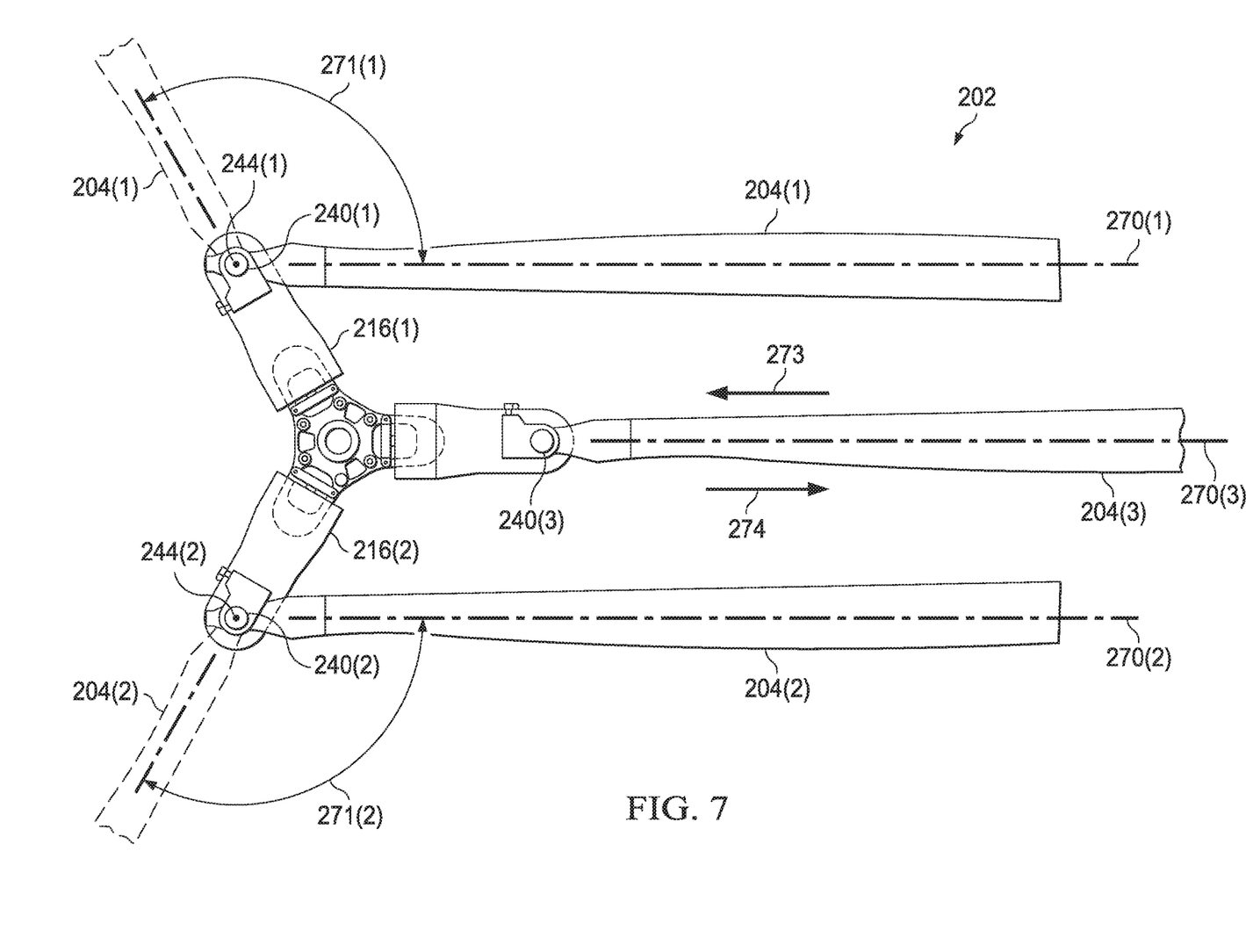
FIG. 7 is a top view of a blade assembly in a folded position according one or more aspects of the disclosure.

Referring to FIG. 7, a rotor blade assembly 202 is shown in a folded position. The rotor blade assembly 202 includes rotor blades 204(1), 204(2), and 204(3). Rotor blades 204(1) and 204(2) are shown in a folded position and the rotor blade 204(3) is shown in an unfolded position. Unfolded rotor blades 204(1) and 204(2) are depicted in shadow. Rotor blade 204(1) has central longitudinal axis 270(1) and rotor blade 204(2) has central longitudinal axis 270(2). Rotor blade 204(1) may be rotated about an arc 271(1) around central axis 244(1). Arc 271(1) illustrates an angle through which rotor blade 204(1) may pivot. Rotor blade 204(2) may be rotated about an arc 271(2) around central axis 244(2). Arc 271(2) illustrates an angle through which rotor blade 204(2) may travel. Arcs 271(1), 271(2) may be in the range of 90° to 180°. Physical stops or proximity sensors may be used to signal the motor 289 to cease rotational movement of rotor blades 204(1), 204(2).

Rotor blade 204(1) is prevented from rotating about central axis 244(1) until tabs 252, 253 have disengaged slots 238, 239 of the blade fold supports 220, 221 associated with rotor blade 204(1). Similarly, rotor blade 204(2) is prevented from rotating about central axis 244(2) until tabs 252, 253 have disengaged slots 238, 239 of the blade fold supports 220, 221 associated with rotor blade 204(2). In some embodiment, blade-fold actuator system 250 includes a secondary locking system that prevents tabs 252, 253, from unlocking. In some embodiments, the secondary locking system includes a pin or tab that slides in front of the tabs 252, 253 to prevent tabs 252, 253 from rotating out of slots 238, 239. In other embodiments, the secondary locking system may include other mechanisms to physically prevent tabs 252, 253 from disengaging slots 238, 239.

An inboard direction 273 points, with respect to each unfolded rotor blade 204, toward yoke 212 and an outboard direction 274 points, with respect to each unfolded rotor blade 204, away from yoke 212.

Figure 8:
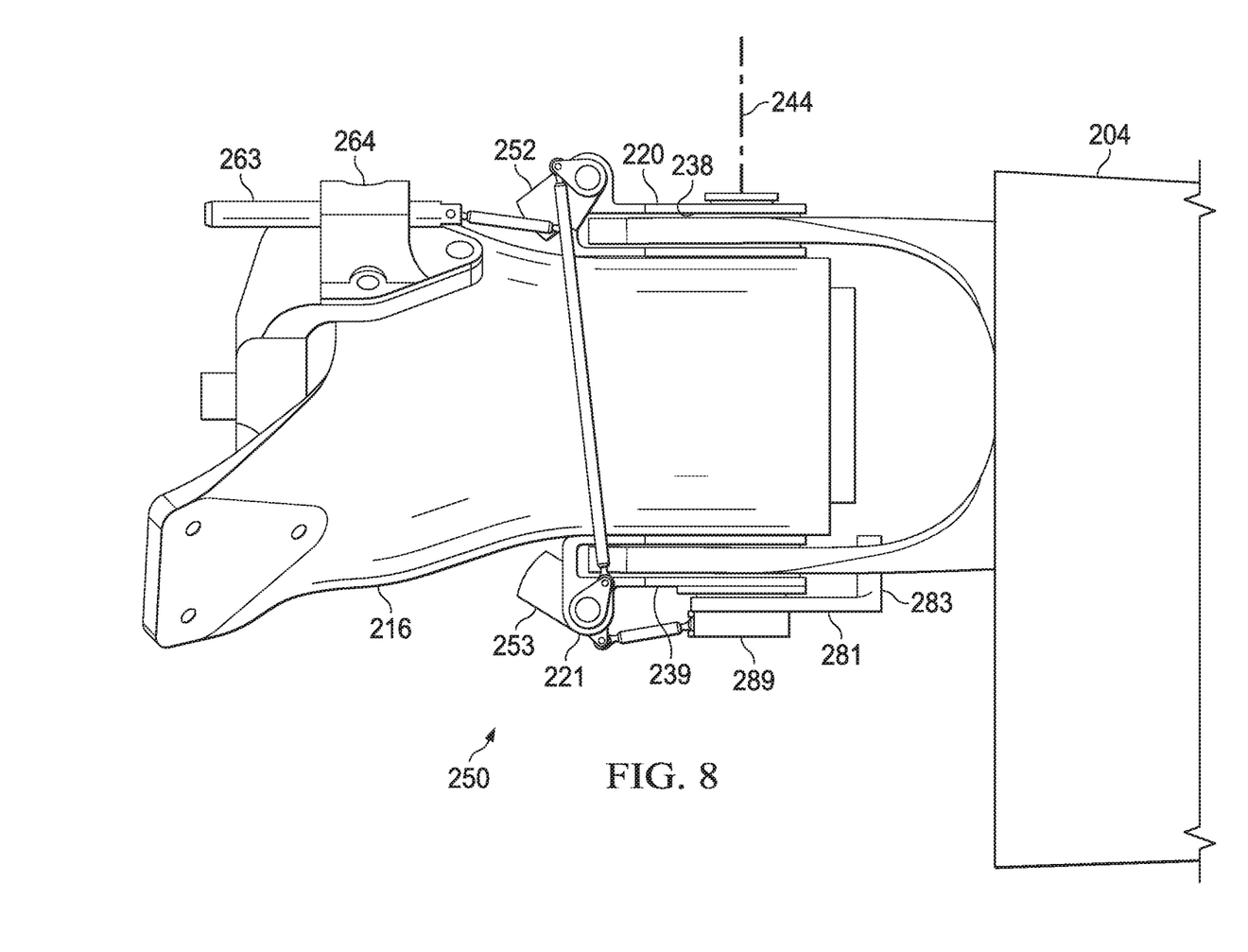
FIG. 8 is a side view of a blade assembly in an unfolded position with a lock assembly in an open position according to one or more aspects of the disclosure.
Figure 9:
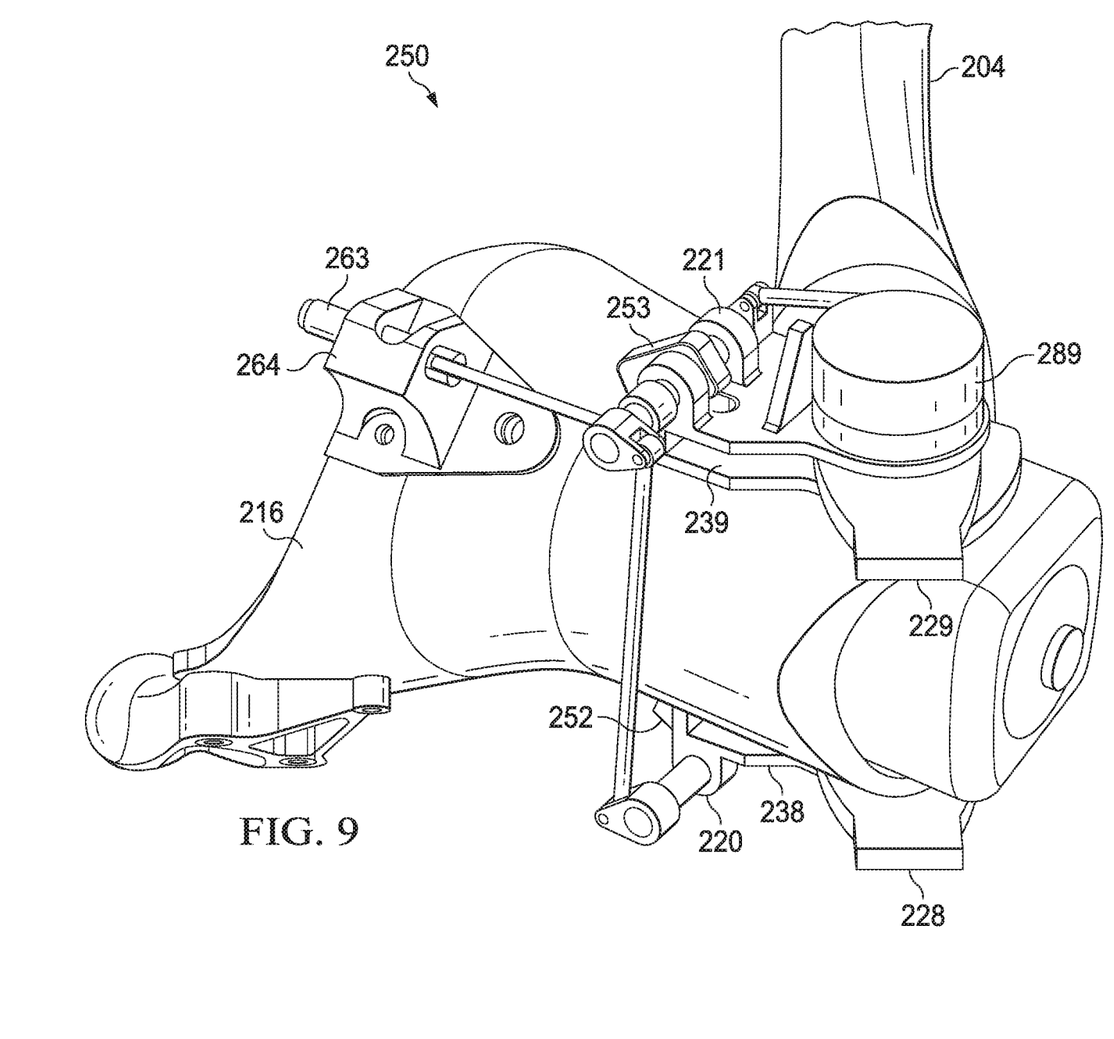
FIG. 9 is a top view of the blade assembly of FIG. 8 in a folded position according to one or more aspects of the disclosure.

FIG. 8 is a side view of an embodiment of blade-fold actuator system 250 an unlocked configuration with rotor blade 204 in an unfolded position. In the unlocked position, tabs 252, 253 are rotated out of slots 238, 239. With tabs 252, 253 in the unlocked position, blade tangs 228, 229 and rotor blade 204 are free to rotate about central axis 244. FIG. 9 is a perspective view of a bottom of the blade-fold actuator system 250 of FIG. 8 with rotor blade 204 in a folded position.

Figure 11:
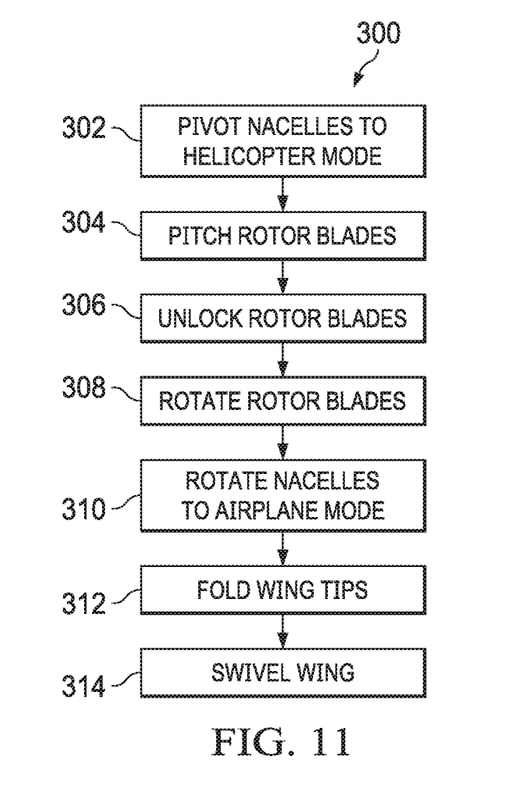
FIG. 11 is a flowchart illustrating actions performed in a method of converting a tiltrotor aircraft from a flight ready position to a stowed position according to aspects of the disclosure.

FIG. 11 is a flow chart illustrating a method 300 of converting the tiltrotor aircraft 100 from a flight ready position to a stowed position. FIG. 8 will be discussed relative to FIGS. 1-9. At block 302, nacelles 115, 117, which house rotor systems 114, 116, respectively, are pivoted to helicopter mode. Each nacelle 115, 117 is rotated nose up to a nacelle angle of approximately 90°. Each nacelle 115, 117 is at an angle of approximately 90° when the longitudinal axis of each nacelle 115, 117 is generally vertical relative to the ground. With nacelles 115, 117 at an angle of approximately 90°, each rotor blade assembly 202 of each rotor system 114, 116 is oriented generally horizontal relative to the ground.

At block 304, each rotor blade 204 of the rotor systems 114, 116 is pitched about its central longitudinal axis 270 to a high-collective position in which the leading edge 248 of each rotor blade 204 is generally facing upward. Pitching rotor blades 204 in this way is referred to as indexing the rotor blades. Pitch-horn actuators operatively connected to the pitch horns facilitate the change in pitch of the rotor blades 204. In some embodiments, pitching rotor blades 204 to the high-collective position is optional.

At block 306, each to-be-folded rotor blade 204 (e.g., rotor blades 204(1) and 204(2) of FIG. 7) is unlocked from its respective blade fold supports 220, 221. Motor 289 unlocks rotor blades 204(1) and 204(2) by rotating tabs 252, 253 out of slots 238, 239. In some embodiments, additional locking pins are removed to permit rotor blades 204(1), 204(2) to pivot about their blade fold bolts. Any additional locking pins may be removed manually or automatically. In some embodiments, motor 289 also engages pitch lock pin 263 of each rotor blade 204(1), 204(2) with a notch in yoke 212 to prevent each rotor blade 204(1), 204(2) from pitching. The position and quantity of to-be-folded rotor blades can vary depending on rotor blade assembly configuration (e.g., the embodiment of FIG. 6 illustrates that two of the three rotor blades are folded).

At block 308, motor 289 rotates each to-be-folded rotor blade 204 about its pivot axis (e.g., the central axis 244 of the blade fold bolts 240, 241) to move each to-be-folded rotor blade 204 toward the folded position. Each of the to-be-folded rotor blades 204 is rotated toward until rotor blades 204 are generally parallel with each other (e.g., see FIG. 7). In some embodiments, physical stops or proximity sensors are used that signal that the actuators should cease movement of the rotor blades when the rotor blades have reached the desired folded position.

At block 310, nacelles 115, 117 are pivoted to airplane mode. Each nacelle 115, 117 is rotated to a nacelle angle of approximately 0°. The nacelle is at an approximately 0° angle when the longitudinal axis of the nacelle is generally horizontal relative to the ground. With the rotor blades 204 in the folded position, each of the rotor blades 204 remains generally horizontal relative to the ground when the nacelles 115, 117 are at an angle of approximately 0°.

At block 312, wing tips 110, 112 are pivoted toward the fuselage 102. At block 714, wing 108 is swivelled about vertical axis 122 to lie above and generally align with the fuselage 102. The entire method 300 of converting tiltrotor aircraft 100 from an operational flight ready position to a stowed position can be completed in a range of 1 to 2 minutes in a wind of up to at least 60 knots. The method 300 can be interrupted or stopped at any point to facilitate maintenance. In some embodiments, manual manipulation of rotor blades 204 is possible in the event of a system failure. It is to be understood that several of the actions of method 300 may occur simultaneously or in different order. In some embodiments, one or more of the steps of method 300 may be eliminated. The order of actions of the method 300 is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A folding rotor blade assembly comprising:
   a blade fold support; and
   a blade-fold actuator system coupled to the blade fold support and comprising:
      a motor;
      a tab rotatably coupled to a shaft of the blade-fold actuator system and configured to rotate into and out of engagement with a blade tang of a rotor blade to selectively prevent rotation of the blade tang;
      a cam connected to the blade fold support and coupled to the motor, the cam configured to rotate the tab between a locked position that prevents rotation of the blade tang and an unlocked position that permits rotation of the blade tang, wherein the tab comprises a tapered face that contacts the blade tang in the locked position;
      a track; and
      a track linkage comprising a first end coupled to the track and a second end connected to the blade fold support.

2. The folding rotor blade assembly of claim 1, further comprising:
   a second blade fold support; and
   wherein the blade-fold actuator system further comprises:
      a second tab configured to rotate into and out of engagement with a second blade tang of the rotor blade; and
      a second cam connected to the second blade fold support and coupled to the cam via a linkage, the second cam configured to rotate the second tab of the blade-fold actuator system between a second locked position that prevents rotation of the second blade tang and a second unlocked position that permits rotation of the second blade tang.

3. The folding rotor blade assembly of claim 2, wherein the blade-fold actuator system further comprises an arm connected to the blade tang.

4. The folding rotor blade assembly of claim 2, further comprising a pitch lock pin coupled to the second cam and configured to lock a pitch of the rotor blade when the second tab is in the second unlocked position.

5. The folding rotor blade assembly of claim 4, further comprising a guide configured to receive the pitch lock pin.

6. The folding rotor blade assembly of claim 1, wherein the track is configured to allow the track linkage to move therethrough for a range of motion before the motor begins to rotate the rotor blade.

7. The folding rotor blade assembly of claim 1, wherein the blade fold support comprises a slot configured to accommodate the blade tang.

8. A folding rotor blade system comprising:
   a yoke;
   a grip coupled to the yoke via an inboard bearing assembly;
   a rotor blade coupled to the grip via an outboard bearing assembly;
   a blade fold support connected to the grip; and
   a blade-fold actuator system coupled to the blade fold support and comprising:
      a motor;
      a tab rotatably coupled to a shaft of the blade-fold actuator system and configured to rotate into and out of engagement with a blade tang of the rotor blade to selectively prevent rotation of the blade tang;
      a cam connected to the blade fold support and coupled to the motor, the cam configured to rotate the tab between a locked position that prevents rotation of the blade tang and an unlocked position that permits rotation of the blade tang, wherein the tab comprises a tapered face that contacts the blade tang in the locked position;
      a track; and
      a track linkage comprising a first end coupled to the track and a second end connected to the blade fold support.

9. The folding rotor blade system of claim 8, further comprising:
   a second blade fold support; and
   wherein the blade-fold actuator system comprises:
   a second tab; and
   a second cam connected to the second blade fold support and coupled to the cam via a linkage, the second cam configured to rotate the second tab of the blade-fold actuator system between a second locked position that prevents rotation of a second blade tang and a second unlocked position that permits rotation of the second blade tang.

10. The folding rotor blade system of claim 9, further comprising a pitch lock pin coupled to the second cam and configured to lock a pitch of the rotor blade when the second tab is in the second unlocked position.

11. The folding rotor blade system of claim 10, further comprising a guide configured to receive the pitch lock pin.

12. The folding rotor blade system of claim 9, wherein the blade-fold actuator system further comprises an arm connected to the blade tang.

13. The folding rotor blade system of claim 8, wherein the track is configured to allow the track linkage to move therethrough for a range of motion before the motor begins to rotate the rotor blade.

14. A folding rotor blade assembly comprising:
 a first blade fold support;
 a second blade fold support; and
 a blade-fold actuator system coupled to the first blade fold support and comprising:
  a motor;
  a first tab rotatably coupled to a shaft of the blade-fold actuator system and configured to rotate into and out of engagement with a first blade tang of a rotor blade to selectively prevent rotation of the first blade tang;
  a first cam connected to the first blade fold support and coupled to the motor, the first cam configured to rotate the first tab between a locked position that prevents rotation of the first blade tang and an unlocked position that permits rotation of the first blade tang;
  a second tab configured to rotate into and out of engagement with a second blade tang of the rotor blade;
  a second cam connected to the second blade fold support and coupled to the first cam via a linkage, the second cam configured to rotate the second tab of the blade-fold actuator system between a second locked position that prevents rotation of the second blade tang and a second unlocked position that permits rotation of the second blade tang;
  a track; and
  a track linkage comprising a first end coupled to the track and a second end connected to the first blade fold support.

15. The folding rotor blade assembly of claim 14, wherein the track is configured to allow the track linkage to move therethrough for a range of motion before the motor begins to rotate the rotor blade.

16. The folding rotor blade assembly of claim 14, wherein the blade-fold actuator system further comprises an arm connected to the first blade tang.

17. The folding rotor blade assembly of claim 14, further comprising a pitch lock pin coupled to the second cam and configured to lock a pitch of the rotor blade when the second tab is in the second unlocked position.

18. The folding rotor blade assembly of claim 17, further comprising a guide configured to receive the pitch lock pin.

19. The folding rotor blade assembly of claim 14, wherein the first blade fold support comprises a slot configured to accommodate the first blade tang.

* * * * *